US007710423B2

(12) United States Patent
Drucker et al.

(10) Patent No.: US 7,710,423 B2
(45) Date of Patent: May 4, 2010

(54) AUTOMATIC LAYOUT OF ITEMS ALONG AN EMBEDDED ONE-MANIFOLD PATH

(75) Inventors: Steven Drucker, Bellevue, WA (US); Henry Sowizral, Bellevue, WA (US); Kentaro Toyama, Miami, FL (US)

(73) Assignee: Microsoft Corproation, Redmond, WA (US)

( * ) Notice: Subject to any disclaimer, the term of this patent is extended or adjusted under 35 U.S.C. 154(b) by 256 days.

(21) Appl. No.: 11/085,500

(22) Filed: Mar. 21, 2005

(65) Prior Publication Data

US 2006/0209062 A1    Sep. 21, 2006

(51) Int. Cl.
  *G06F 17/00*    (2006.01)
  *G06T 1/00*    (2006.01)
  *G06T 15/00*    (2006.01)
  *G06T 13/00*    (2006.01)
(52) U.S. Cl. .................... 345/474; 345/473; 345/959
(58) Field of Classification Search ............. 345/475, 345/959
  See application file for complete search history.

(56) References Cited

U.S. PATENT DOCUMENTS

| | | | | |
|---|---|---|---|---|
| 5,396,590 A | * | 3/1995 | Kreegar | 715/808 |
| 5,499,330 A | * | 3/1996 | Lucas et al. | 715/205 |
| 5,717,848 A | * | 2/1998 | Watanabe et al. | 345/474 |
| 5,872,566 A | * | 2/1999 | Bates et al. | 715/786 |
| 5,940,076 A | * | 8/1999 | Sommers et al. | 715/834 |
| 5,977,974 A | * | 11/1999 | Hatori et al. | 715/839 |
| 6,243,076 B1 | * | 6/2001 | Hatfield | 345/156 |
| 6,295,062 B1 | | 9/2001 | Tada et al. | |
| 6,335,737 B1 | * | 1/2002 | Grossman et al. | 715/719 |
| 6,466,237 B1 | * | 10/2002 | Miyao et al. | 715/838 |

(Continued)

FOREIGN PATENT DOCUMENTS

JP    11095968 A  *  4/1999

(Continued)

OTHER PUBLICATIONS

Article "Cartesian Coordinates" by Weisstein, Eric W. From MathWorld.http://mathworld.wolfram.com/CartesianCoordinates.html.*

*Primary Examiner*—Ulka Chauhan
*Assistant Examiner*—Crystal Murdoch
(74) *Attorney, Agent, or Firm*—Woodcock Washburn LLP (57) ABSTRACT

The coordinates for laying out visual items in two-, three-, or n-dimensional space along an embedded one-manifold or path are calculated and coordinates are generated for placement of the items in a container. A one-manifold may be continuous, discontinuous, be contained entirely within a container or extent beyond a container. The one-manifold may be defined by a set of parameters defining a function, formula or set of points. The container may be a two-dimensional, three-dimensional, or n-dimensional container. Such a mechanism may be employed by a graphics application and may determine the location or positioning of an object or item. The object or item may be one of a set of objects or items. In response to receiving a set of parameters defining a one-manifold, the one-manifold may be embedded within a container. In response to receiving a set of parameters describing aspects of the object or item to be placed within the container, a set of x and y or x, y and z co-ordinates may be generated, which may be sent to a standard graphics interface for display.

22 Claims, 8 Drawing Sheets

U.S. PATENT DOCUMENTS

| | | | |
|---|---|---|---|
| 6,473,751 B1* | 10/2002 | Nikolovska et al. | 707/3 |
| 6,768,999 B2* | 7/2004 | Prager et al. | 707/102 |
| 6,819,344 B2* | 11/2004 | Robbins | 715/848 |
| 6,938,217 B1* | 8/2005 | Ubillos | 715/835 |
| 6,956,574 B1* | 10/2005 | Cailloux et al. | 345/473 |
| 6,973,628 B2* | 12/2005 | Asami | 715/838 |
| 6,989,848 B2* | 1/2006 | Lipsky et al. | 345/671 |
| 6,990,230 B2* | 1/2006 | Piponi | 382/154 |
| 7,084,875 B2* | 8/2006 | Plante | 345/473 |
| 7,139,001 B2* | 11/2006 | Hoddie et al. | 345/473 |
| 7,139,006 B2* | 11/2006 | Wittenburg et al. | 345/679 |
| 7,178,111 B2* | 2/2007 | Glein et al. | 715/848 |
| 7,249,327 B2* | 7/2007 | Nelson et al. | 715/782 |
| 7,383,503 B2* | 6/2008 | Banks | 715/273 |
| 2002/0018061 A1* | 2/2002 | Gantt | 345/419 |
| 2002/0033848 A1* | 3/2002 | Sciammarella et al. | 345/838 |
| 2002/0186252 A1* | 12/2002 | Himmel et al. | 345/787 |
| 2003/0076306 A1* | 4/2003 | Zadesky et al. | 345/173 |
| 2003/0081012 A1* | 5/2003 | Chang | 345/848 |
| 2003/0197702 A1* | 10/2003 | Turner et al. | 345/473 |
| 2004/0100479 A1* | 5/2004 | Nakano et al. | 345/700 |
| 2004/0150657 A1* | 8/2004 | Wittenburg et al. | 345/619 |
| 2004/0155907 A1* | 8/2004 | Yamaguchi et al. | 345/810 |
| 2005/0046630 A1* | 3/2005 | Jacob et al. | 345/475 |
| 2005/0071774 A1* | 3/2005 | Lipsky et al. | 715/788 |
| 2006/0026521 A1* | 2/2006 | Hotelling et al. | 715/702 |
| 2006/0174211 A1* | 8/2006 | Hoellerer et al. | 715/782 |
| 2008/0143725 A1* | 6/2008 | Leung et al. | 345/441 |

FOREIGN PATENT DOCUMENTS

| | | |
|---|---|---|
| WO | WO 01/14956 A2 | 3/2001 |
| WO | WO 03/042967 A2 | 5/2003 |

\* cited by examiner

AUTOMATIC LAYOUT OF ITEMS ALONG AN EMBEDDED ONE-MANIFOLD PATH

FIELD OF THE INVENTION

The invention relates to graphics applications and in particular to laying out items in two-dimensional space, three-dimensional space, and n-dimensional space along a one-manifold path embedded within a container.

BACKGROUND OF THE INVENTION

In graphics applications, a user needs to be able to see and lay out visual items in a deterministic fashion, very often as an ordered list of items. In some graphics applications, two-dimensional items are automatically laid out based on a layout policy. Typically, items are placed sequentially within a two-dimensional (usually rectangular) container in a left-to-right, right-to-left, top-to-bottom or bottom-to-right pattern. Typical layout policies include flow layout, in which objects (usually rectangular) are placed in a rectangular window from left to right, dock panels, in which objects are laid out vertically and grid layout in which objects are laid out in tabular fashion, the "grid" consisting of cells that are arranged in rows and columns.

When placing objects in three- or higher-dimensional containers, there are fewer preconceptions about how objects "should be" laid out and there are also fewer constraints. There is a need in the art to provide a more flexible way to lay out visual items not only in two-dimensional space but also in three- or higher-dimensional space.

SUMMARY OF THE INVENTION

A mechanism is provided for laying out visual items in two-, three- or n-dimensional space along an embedded one-manifold or path. A one-manifold may be continuous, discontinuous, be contained entirely within a container or may extend beyond a container. The one-manifold may be defined by a set of parameters defining a function, formula or set of points. The container may be a two-dimensional, three-dimensional, or n-dimensional container.

Such a mechanism may be employed by a graphics application and may determine the location or positioning of an object or item. The object or item may be one of a set of objects or items. In response to receiving a set of parameters defining a one-manifold, the one-manifold may be embedded within a container. In response to receiving a set of parameters describing aspects of the object or item to be placed within the container, a set of x and y or x, y and z, etc. co-ordinates may be generated, which may be sent to a standard graphics interface for display.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

The simplest way to arrange items within a container or upon a canvas is to specify the position and orientation of each item. Such a fixed layout scheme is not very useful however, when changes occur. For example, to insert a new item upon an existing canvas using such a scheme, a programmer must specify the placement of the new item. If there is insufficient "visual space" for that item in the desired location, the programmer must re-arrange the original items to make room for the new one.

Similarly, if the shape or size of the canvas changes, all the items may no longer be able to be displayed. If all the items must continue to remain visible, code that rearranges the placement of the items must be provided. If the container does not have enough room to display all the items, the layout may show only some of the items. A scroll bar may enable a user to choose which of the items are visible.

The introduction of a third dimension (or more) changes how items are placed within a container.

Exemplary Computing Environment

Figure 1:
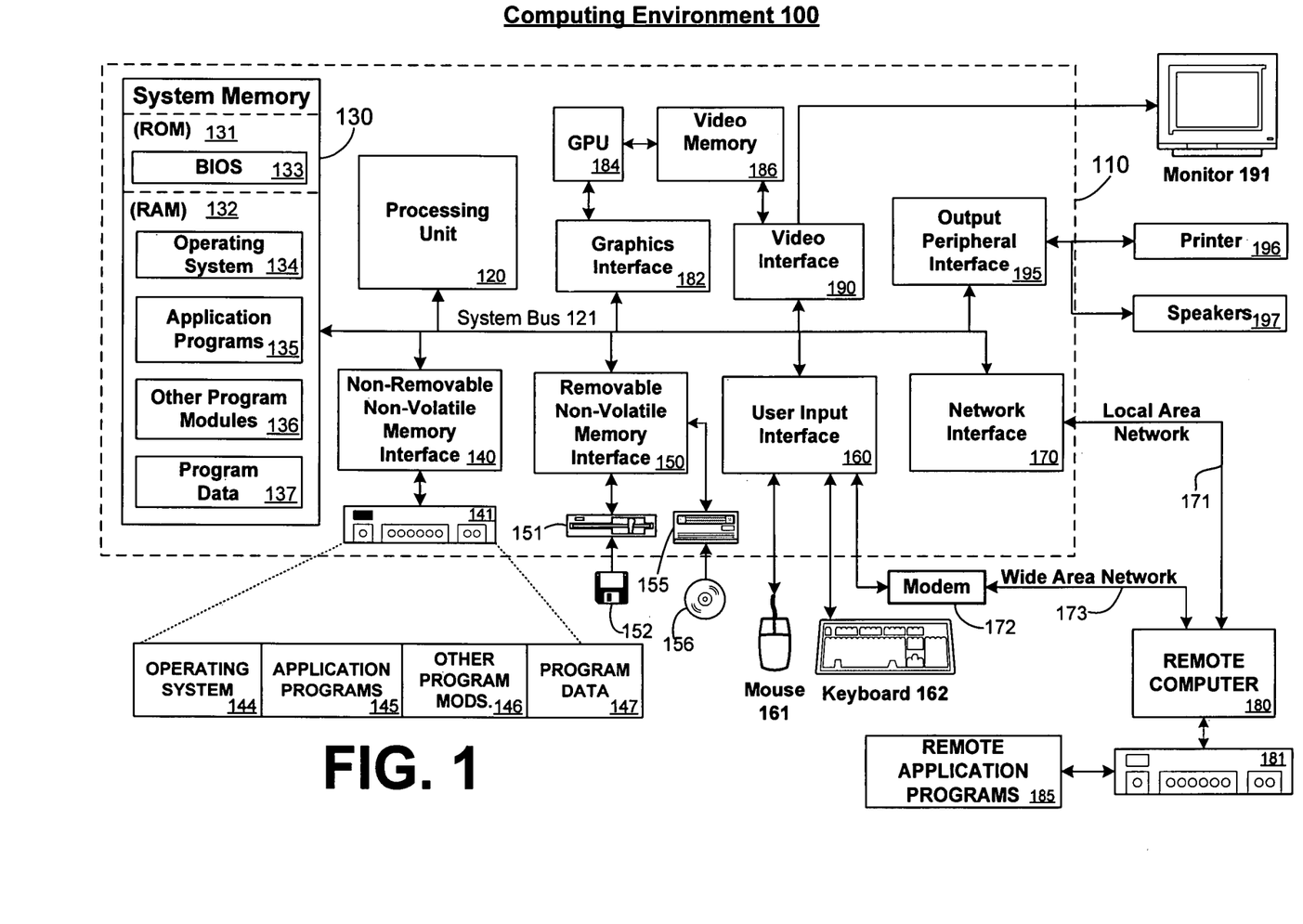
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Automatic Layout of Items Using a One-Manifold Path

Figure 2:
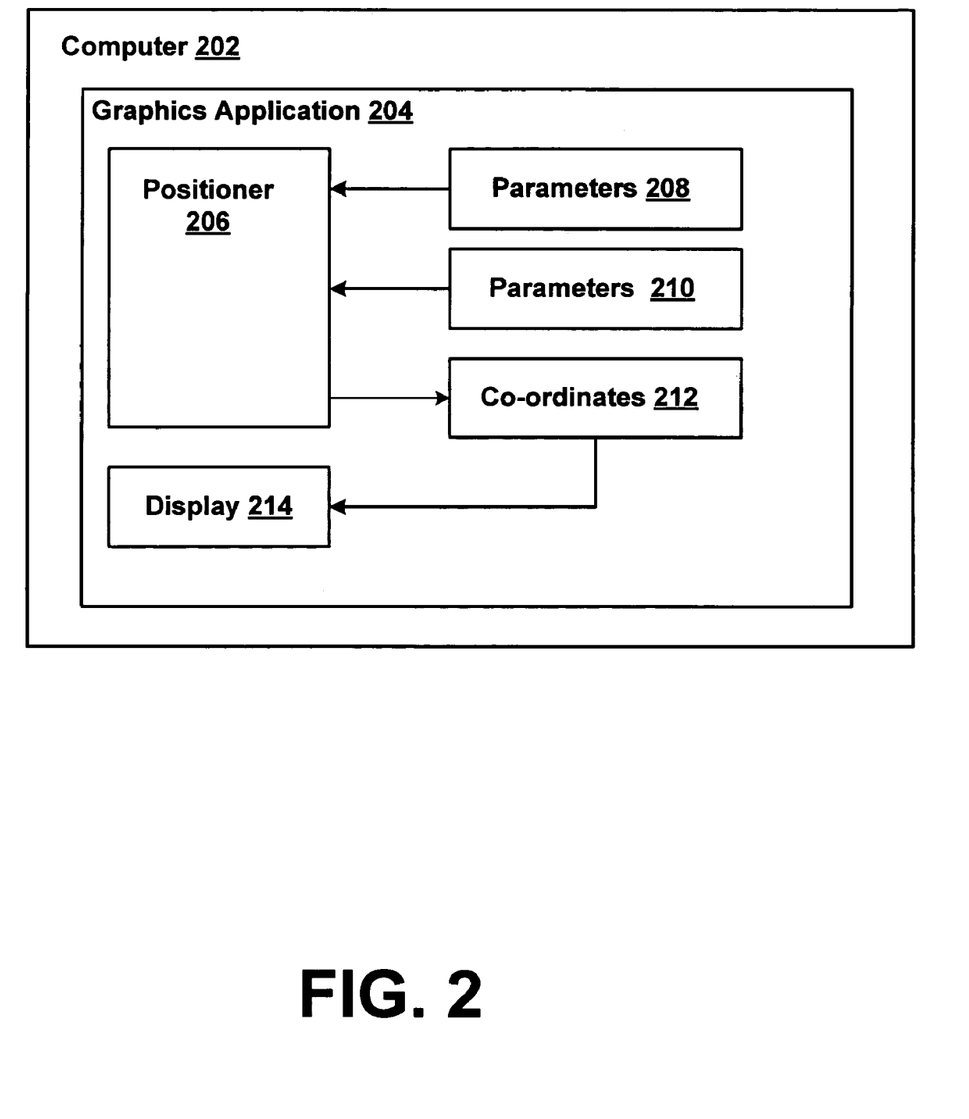
FIG. 2 is a block diagram of an exemplary system for positioning an object or item along a one-manifold embedded within a container in accordance with one embodiment of the invention.
Figure 3A:
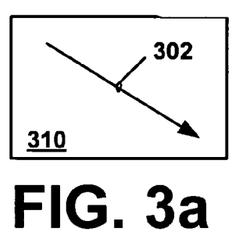
FIGS. 3a-3d illustrates exemplary one-manifolds in two-dimensional containers in accordance with embodiments of the invention.
Figure 3B:
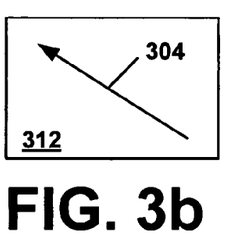
Figure 3C:
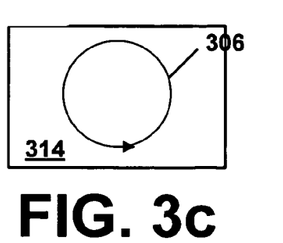
Figure 3D:
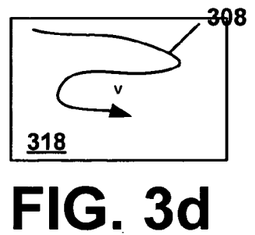

FIG. 2 illustrates an exemplary system for automatic layout of items in two-dimensional, three-dimensional, or n-dimensional space in accordance with some embodiments of the invention. Such a system may reside in whole or in part on one or more computers, such as exemplary computer 202 of FIG. 2. Computer 202 may comprise a computer such as computer 110 described with respect to FIG. 1. A system for automatic layout of items in two-dimensional, three-dimensional, or n-dimensional space may comprise a graphics application 204 including one or more of the following elements: a graphics positioning application 206, parameters describing a one-manifold 208, object or item positioning and orienting parameters 210, positioning co-ordinates 212 and a standard display module 214.

When placing items within a two-dimensional, three-dimensional, or n-dimensional container, in some embodiments of the invention, a first-object-first/last-object-last paradigm is employed. In accordance with some embodiments of the invention, a first-object-first/last-object-last paradigm may place objects along any path, (e.g., along any one-manifold or one-dimensional path or line) embedded within the space, hence providing such a path enables a general means for mapping the objects using the first-object-first/last-object-last paradigm into the space. The one-manifold or path may be open, (that is, may begin and end at different points within the space), or closed (begin and end at the same point within the space), continuous or discontinuous, curved, straight or segmented (piece-wise smooth). The one-manifold may be polynomial-based or non-polynomial-based and can be of any length. The one-manifold may extend beyond the container in which it is embedded or may be confined within it embedding container. FIGS. 3a-3d illustrate four such paths (paths 302, 304, 306 and 308 respectively of an infinitely large number of possible paths within a two-dimensional space (310, 312, 314, and 316 respectively).

Figure 4A:
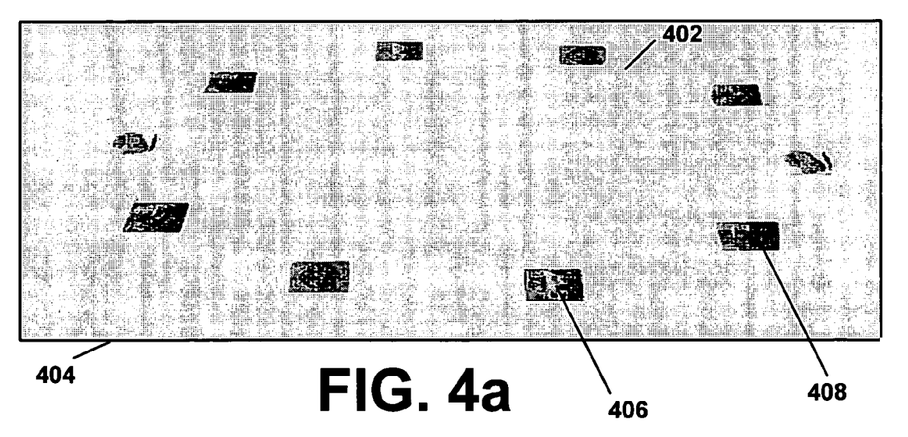
FIG. 4a illustrates an exemplary one-manifold in a three-dimensional container in accordance with one embodiment of the invention.

It will be appreciated that an infinitely large number of possible closed and open paths within a three-dimensional space are also possible. FIG. 4a illustrates one such possible closed, circular, one-manifold 402 embedded into a three-dimensional-space 404 with items 406, 408, etc. uniformly distributed along the one-manifold 402. In some embodiments of the invention, the one-manifold (e.g., 302, 304, 306, 308, 402, etc.) may be specified as a set of points connected by straight lines, or as reference points for some higher order interpolation function or curve definition function. Items may be placed along the one-manifold uniformly, randomly, according to some function or equation, or based on an item's extent (and any additional space that should surround that item) to allocate space along the one-manifold, or by any other function, algorithm, or scheme. For example, a layout algorithm could place items using the width of each item plus a minimum amount of surrounding space, specified either as a fixed value, as a percentage, or as some fixed function of the extent of the item and/or of the extent of the item's neighbor.

Figure 4B:
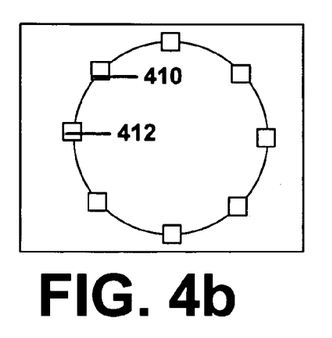
FIGS. 4b-4c illustrate exemplary object orientations in two-dimensional containers in accordance with embodiments of the invention.
Figure 4C:
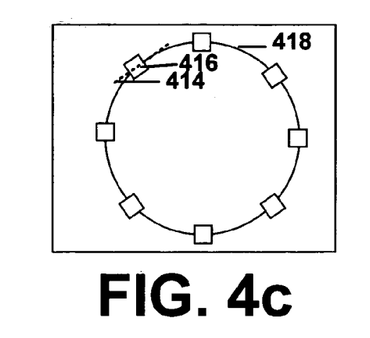

The scale or orientation of the item(s) may also be specified. For example, an item may be perpendicular to the one-manifold, skewed, rotated, oriented so that the top of the item is parallel to the top of the container (see FIG. 4b, items 410, 412, etc.). Alternatively, a center line of an item may be oriented tangent to the path (see FIG. 4c, center line 414 of item 416 along path 418) or according to any function, algorithm or scheme.

Figure 4D:
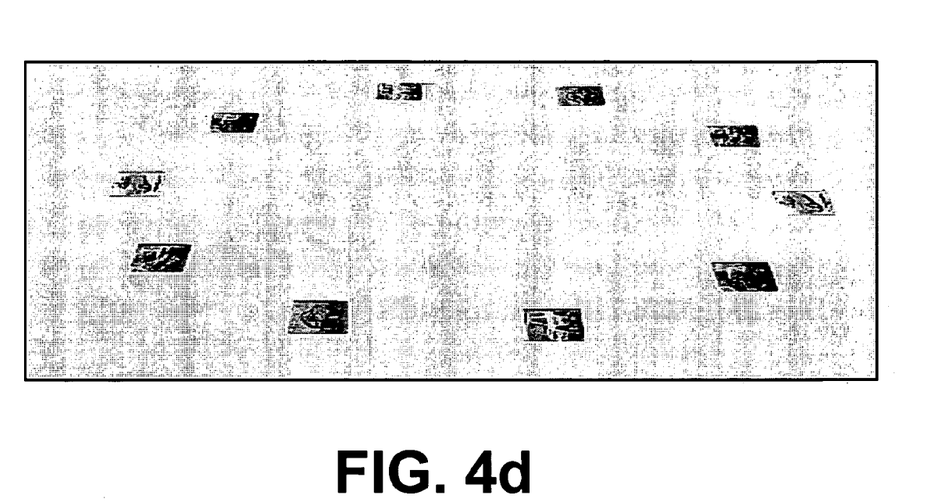
FIGS. 4d-4f illustrate exemplary object orientations in three-dimensional containers in accordance with embodiments of the invention.
Figure 4E:
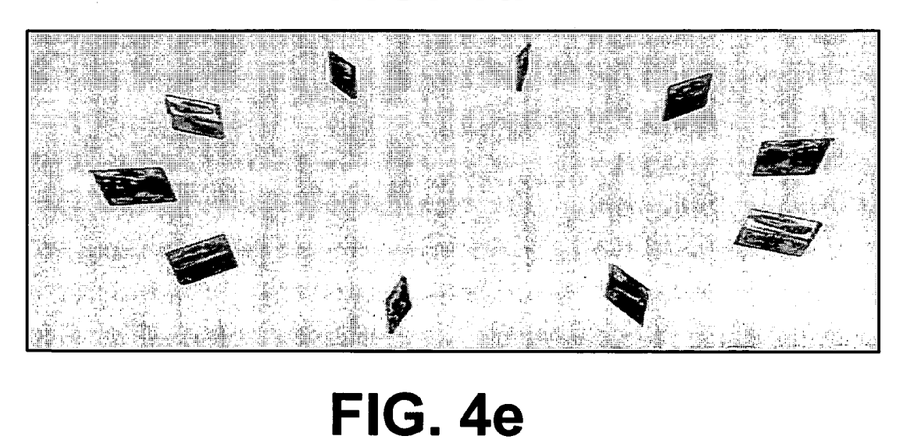
Figure 4F:
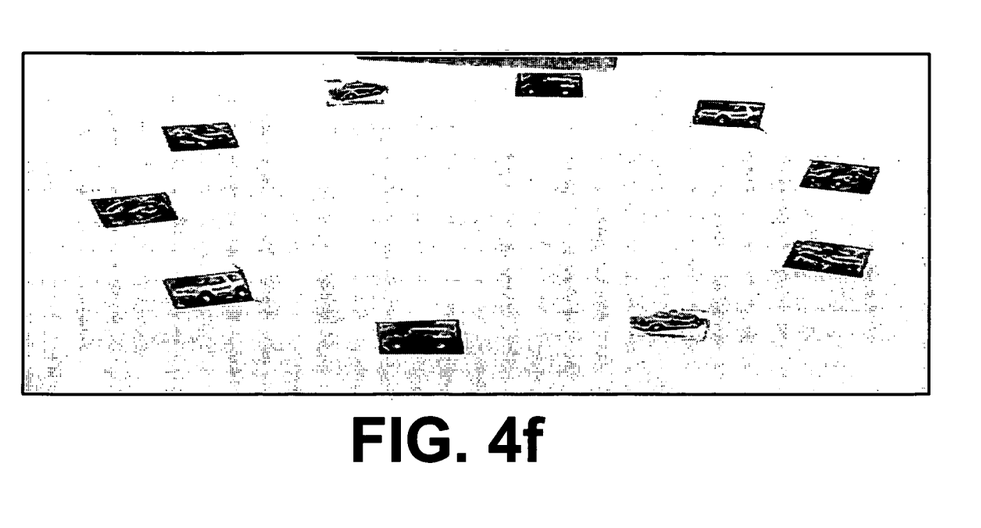

In three-dimensional space, items may be laid flat with the top edge of the item oriented to the left as illustrated in FIG. 4d. Similarly, items may be oriented perpendicularly to the one-manifold with the top edge up, as illustrated in FIG. 4e or items may be oriented to the viewer with the top edge of the item up, as illustrated in FIG. 4f.

Thus, in some embodiments of the invention, the orientation of the item may be specified in relation to some point, axis or plane, or may be oriented as some function of the item itself, its neighbors, and/or the item's neighborhood. Examples of such item-orientation specification could include items facing the viewer, facing a point in three-dimensional-space, tangent (or normal) to a path and so on. An item can also be oriented according to various rules that may incorporate parameters apart from those specified by the manifold itself. For example, items on the manifold may exhibit inertial characteristics that depend on speed of movement: Items could be modeled as objects with mass, which "hang" on the manifold as on a rail; depending on the speed of item movement, they may then orient themselves away from the center of curvature. Other possibilities include enforcing orthogonality of an axis of the item with the tangent of the one-manifold while the object remains "facing" a particular point in space.

Figure 4G:
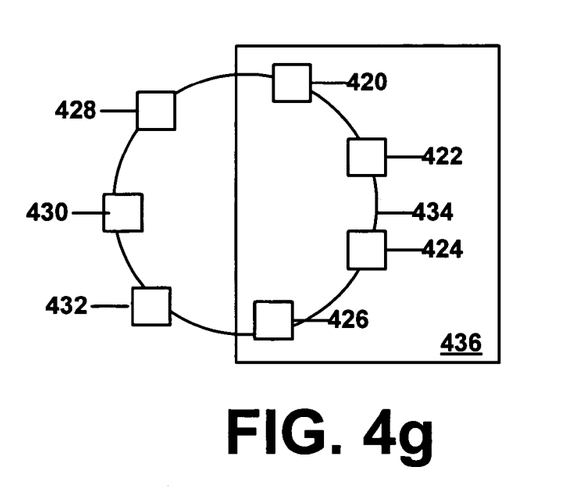
FIG. 4g illustrates an exemplary one-manifold that extends outside a two-dimensional container in accordance with one embodiment of the invention.
Figure 4H:
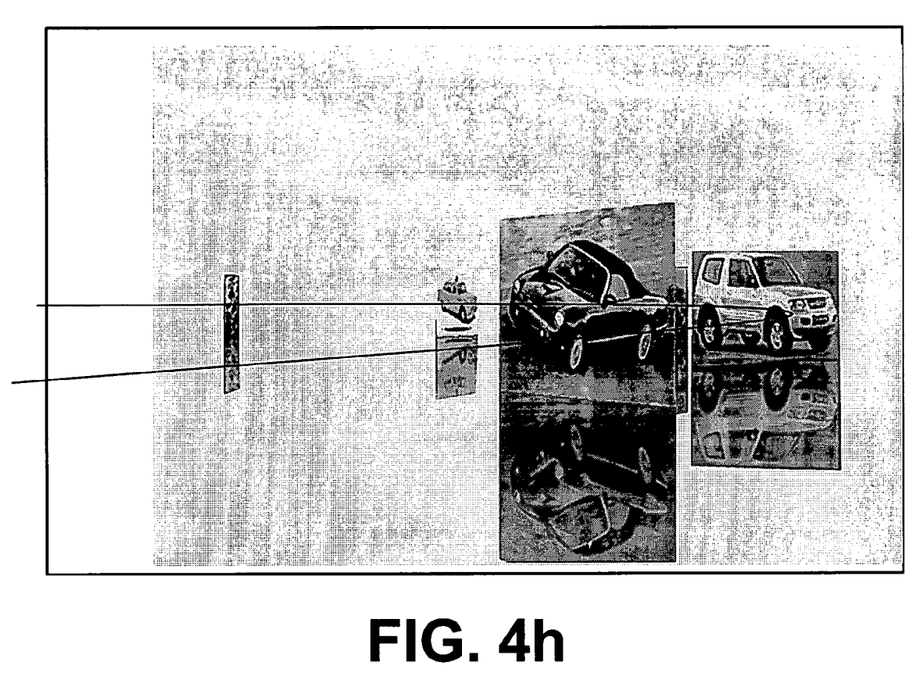
FIG. 4h illustrates an exemplary one-manifold that extends outside a three-dimensional container in accordance with one embodiment of the invention.

By specifying a one-manifold so that portions of the one-manifold fall outside the visible portion of its container, the items on the portion of the manifold outside that container would not be visible, as illustrated in FIG. 4g. (Items 420, 422, 424 and 426 are visible while items 428, 430 and 432 along one-manifold 434 are not visible because they fall outside container 436.) A similar one-manifold extending outside the container is illustrated in FIG. 4h.

In some embodiments of the invention, only a subset of the items is displayed. This may be necessary when there are more items than can be desirably displayed in the available space. In some embodiments of the invention, the displayed subset of items is representative of the complete set of items. The first item in the subset may be defined as the first item on the one-manifold.

Figure 5A:
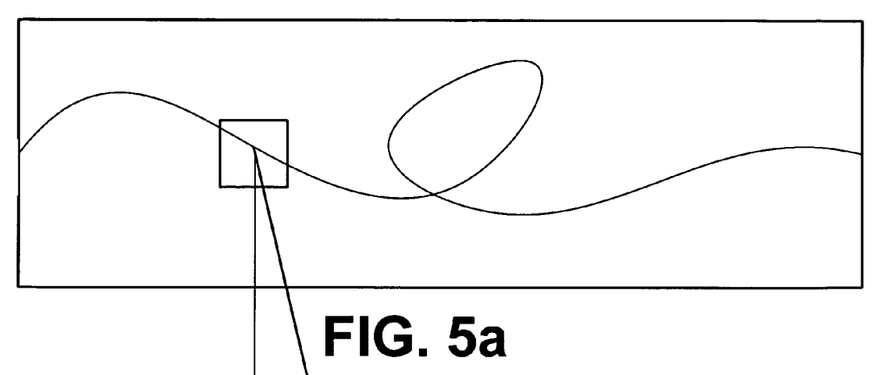
FIGS. 5a-5c illustrate exemplary scrolling mechanisms in accordance with some embodiments of the invention.
Figure 5B:
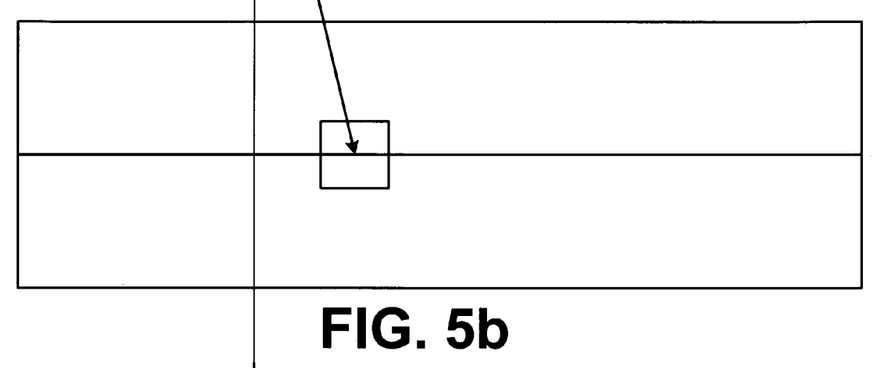
Figure 5C:
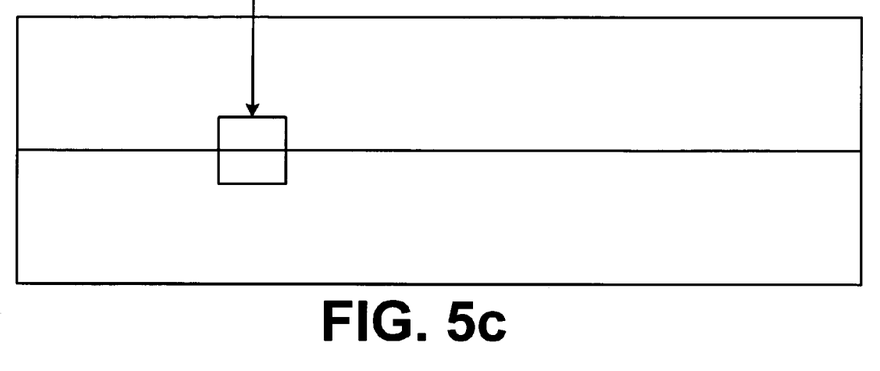

In some embodiments of the invention, all of the items in the set may be visible by scrolling along the one-manifold. In some embodiments of the invention, a position along the one-manifold is mapped to a position along a linear scroll bar. Hence, scrolling across the one-manifold is translated to movement along the straightened path (see FIGS. 5a, 5b and 5c). In some embodiments of the invention, the distance along the one-manifold is mapped to the corresponding distance along the straightened path (see FIGS. 5a and 5b). Alternatively, the position of point along an axis (such as but not limited to the x-axis) may be mapped to the straightened path (see FIGS. 5a and 5c). Other mappings may use a point's abscissa as the value along the straightened path or provide some other one-to-one mapping. Any point on the 2D display may be mapped to a single point on the one-manifold, in such a way that for any given point (x, y) mapped to a point s on the manifold (where s is drawn from a continuous parameterization of the manifold) there are finite, non-zero values, $\epsilon$ and $\delta$, such that a if (x', y') is within distance $\epsilon$ from (x, y), the mapped point s' corresponding to (x', y') is necessarily such that $|s'-s|<\delta$. However, it can easily be proven that many one-manifolds admit singularities, in which case this condition is violated. In such cases, there are a number of contrivances which can alleviate the mapping, which may be employed. By way of non-limiting example, a few are listed here. In one embodiment, the singularities are disregarded altogether and the cursor (or other indicator) is allowed to jump over discontinuities. In one embodiment, a "spring" is realized between the cursor at the previous point s on the manifold and the current s', such that the spring pulls the cursor smoothly between s and s', even when there is a non-continuous jump between them. In another embodiment, the cursor remains stuck at point s.

Figure 6:
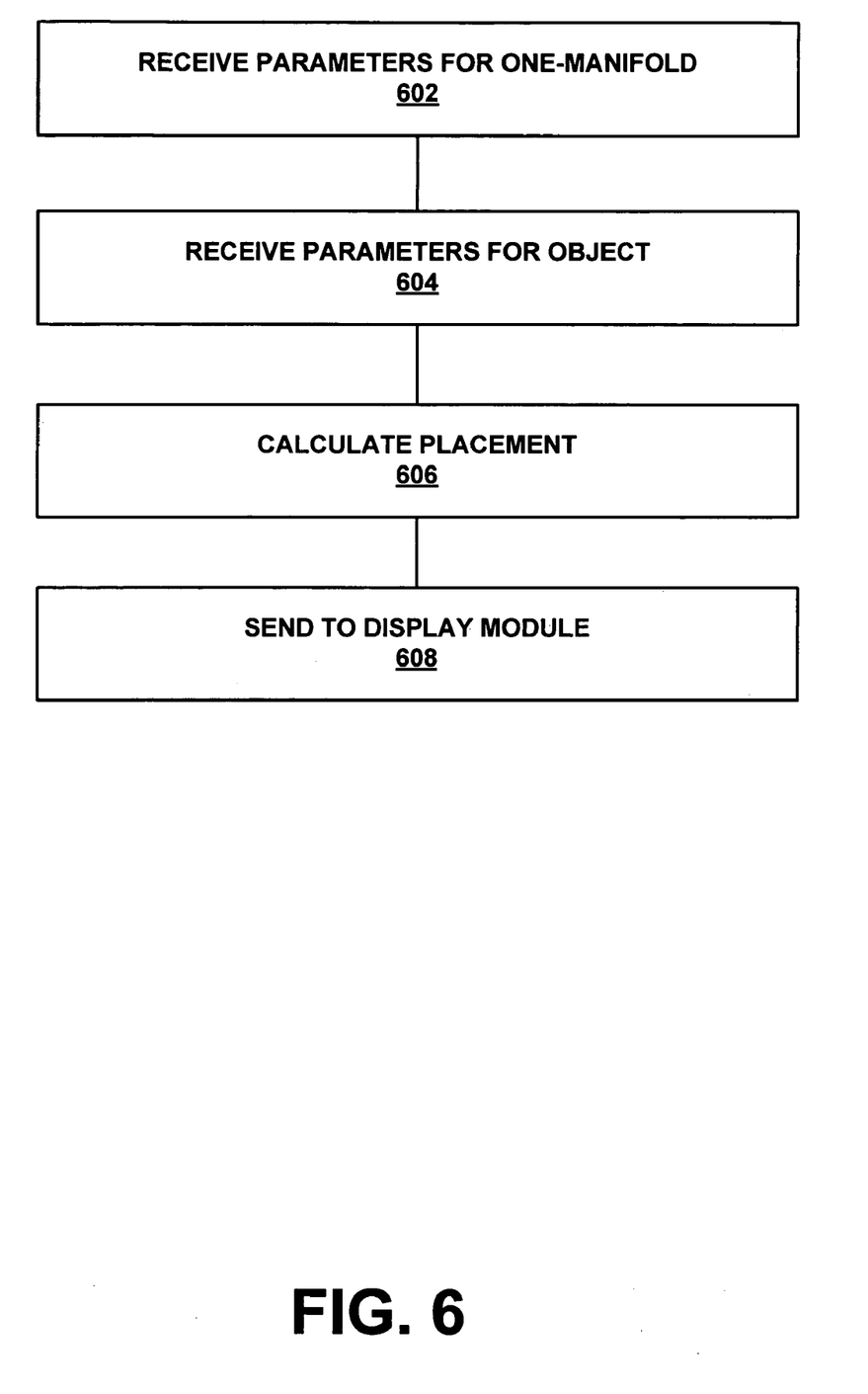
FIG. 6 illustrates a method for generating position co-ordinates in accordance with one embodiment of the invention.

An exemplary method for placing an object in a container along an embedded one-manifold is illustrated in FIG. 6. At 602 parameters associated with or defining the one-manifold may be received. The one-manifold or path may be open, (that is, may begin and end at different points within the space), or closed (begin and end at the same point within the space), continuous or discontinuous, curved, straight or segmented (piece-wise linear). The one-manifold may be polynomial-based or non-polynomial-based and can be of any length. The one-manifold may extend beyond the container in which it is embedded or may be confined within it embedding container.

At 604 parameters associated with the object to be placed along the embedded one-manifold are received. Parameters associated with the scale or orientation of the item(s) may be specified. For example, an item may be perpendicular to the one-manifold, skewed, rotated, oriented so that the top of the item is parallel to the top of the container. Alternatively, a center line of an item may be oriented tangent to the path or according to any function, algorithm or scheme.

In three-dimensional space, items may be laid flat with the top edge of the item oriented to the left, oriented perpendicularly to the one-manifold with the top edge up, or may be oriented to the viewer with the top edge of the item up, or in any other designated orientation.

Thus, in some embodiments of the invention, the orientation of the item may be specified in relation to some point, axis or plane, or may be oriented as some function of the item itself, its neighbors, and/or the item's neighborhood. Examples of such item-orientation specification could include items facing the viewer, facing a point in three-dimensional-space, tangent (or normal) to a path and so on.

By specifying a one-manifold so that portions of the one-manifold fall outside the visible portion of its container, the items on the portion of the manifold outside that container would not be visible In some embodiments of the invention, only a subset of the items is displayed. This may be necessary when there are more items than can be desirably displayed in the available space. In some embodiments of the invention, the displayed subset of items is representative of the complete set of items. The first item in the subset may be defined as the first item on the one-manifold.

At 606 the placement of the object or objects are calculated. In some embodiments of the invention, x and y coordinates (for a two-dimensional container) or x, y and z coordinates (for a three-dimensional container) are calculated. At 608, the coordinates (and possibly the object(s) are passed to a standard display module for display.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A system for positioning objects in a container of a graphics application, the system comprising:
    a processor comprising a positioner module that receives parameters associated with placing a set of objects along a curved one-manifold embedded, at least in part, within the container, and provides positioning coordinates along the curved one-manifold based, at least in part, on a non-zero amount of space defined by a dimensional attribute of an individual object, the non-zero amount of space surrounding each object in the set of objects, and wherein placing the set of objects along the curved one-manifold comprises rendering each object with a center line of each object oriented tangentially to the curved one-manifold.

2. The system of claim 1, wherein the one-manifold is configured as a rail, and wherein placing each object comprises modeling each object as having a mass and further comprises hanging each object from the one-manifold configured as a rail.

3. The system of claim 2, wherein the each object is configured to exhibit an inertial characteristic that depends on speed of movement of each object with respect to the one-manifold.

4. The system of claim 1, wherein the set of objects is placed along the one-manifold using a first-object-first/last-object-last paradigm.

5. The system of claim 1, wherein the one-manifold comprises one of a segmented path or a piece-wise smooth path.

6. The system of claim 1, wherein at least one object is placed such that a major surface of the at least one object is orthogonal to an x-y plane of the container.

7. The system of claim 1, wherein the curved one-manifold is a circular one-manifold.

8. The system of claim 1, wherein the curved one-manifold is an open-ended one-manifold.

9. The system of claim 1, wherein the curved one-manifold is derived from a polynomial.

10. A method for placing objects in a container of a graphics application system that is executed on a computer, the method comprising:
    defining via the computer, a circular one-manifold of the graphics application system based, at least in part, on a non-zero amount of space surrounding each object of a set of objects that are to be placed along the circular one-manifold, wherein the non-zero amount of space is defined by a dimensional attribute of each object;
    determining via the computer, a set of x, y, and z coordinates; and
    using the x, y, and z coordinates to place each object with a center line of each object oriented in a radial direction so as to orthogonally intersect the circular one-manifold, wherein the center line of each object is defined as a horizontal axis extending from one edge of the object to an opposing edge of the object.

11. The method of claim 10, wherein placing the set of objects comprises a scaling of at least one of the objects.

12. The method of claim 10, wherein each object comprises a rectangular profile and the horizontal axis extends from a first minor edge of the rectangular profile to an opposing minor edge of the rectangular profile.

13. The method of claim 10, wherein each object comprises a rectangular profile and the horizontal axis extends from a first major edge of the rectangular profile to an opposing major edge of the rectangular profile.

14. The method of claim 13, wherein the set of objects is oriented such that a major face of each object is coplanar to a radial plane defined by the circular one-manifold.

15. A computer-readable storage medium comprising computer-executable instructions for:
    defining a curved one-manifold;
    placing a set of objects along the curved one-manifold based, at least in part, on a non-zero amount of space defined by a dimensional attribute of an individual object, the non-zero amount of space surrounding each object in the set of objects;
    embedding at least a portion of the curved one-manifold in a visible portion of a container of a graphics application; and
    translating a scrolling movement of a cursor along the curved one-manifold into a corresponding movement of a position indicator along a horizontal scroll bar, the translating comprising mapping of a position along the one-manifold to a corresponding position of the position indicator along the horizontal scroll bar.

16. The computer-readable storage medium of claim 15, wherein the horizontal scroll bar is a linear scroll bar, and mapping of the position of the cursor along the curved one-manifold to the corresponding position of the position indicator along the linear scroll bar comprises a one-to-one mapping of abscissa values of the cursor along the curved manifold to corresponding abscissa values of the position indicator along the linear scroll bar.

17. The computer-readable storage medium of claim 15, wherein the horizontal scroll bar is a linear scroll bar, and mapping of the position of the cursor along the curved one-manifold to the corresponding position of the position indicator along the horizontal scroll bar comprises mapping a traversed distance by the cursor along the curved one-manifold to a corresponding one-to-one traversal distance of the position indicator along the linear scroll bar.

18. The computer-readable storage medium of claim 15, wherein the horizontal scroll bar is a linear scroll bar, and mapping of the position of the cursor along the curved one-manifold to the corresponding position of the position indicator along the horizontal scroll bar comprises mapping of a point along a z-axis to a corresponding point of the position indicator along the linear scroll bar.

19. The computer-readable storage medium of claim 15, wherein the horizontal scroll bar is a linear scroll bar, and mapping of the position of the cursor along the curved one-manifold to the corresponding position of the position indicator along the horizontal scroll bar comprises mapping of a point's (x, y) location along the curved one-manifold to a corresponding point of the position indicator along the linear scroll bar.

20. The computer-readable storage medium of claim 15, wherein the curved one-manifold is a discontinuous one-manifold and a spring action is realized on the movement of a cursor traveling along the discontinuous one-manifold whereby the spring action provides a smooth transition of the cursor through a discontinuity in the discontinuous one-manifold.

21. The computer-readable storage medium of claim 15, wherein placing the set of objects along the curved one-manifold comprises configuring the one-manifold as a rail and hanging the set of objects from the rail.

22. The computer-readable storage medium of claim 21, wherein depending on a speed of movement of an object along the curved one-manifold, the object is oriented away from the center of curvature of the curved one-manifold.

* * * * *